US010823323B2

(12) United States Patent
Fremont et al.

(10) Patent No.: US 10,823,323 B2
(45) Date of Patent: Nov. 3, 2020

(54) FLUID CONNECTOR HAVING A DEFORMABLE TAB AND PLUG/CONNECTOR ASSEMBLY

(71) Applicant: Jiffy-tite Co., Inc., Lancaster, NY (US)

(72) Inventors: Bradley C. Fremont, Tonawanda, NY (US); Steven R. Zillig, Clarence, NY (US)

(73) Assignee: Oetiker NY, Inc., Lancaster, NY (US)

( * ) Notice: Subject to any disclaimer, the term of this patent is extended or adjusted under 35 U.S.C. 154(b) by 793 days.

(21) Appl. No.: 15/448,168

(22) Filed: Mar. 2, 2017

(65) Prior Publication Data

US 2017/0254453 A1 Sep. 7, 2017

Related U.S. Application Data

(60) Provisional application No. 62/303,137, filed on Mar. 3, 2016.

(51) Int. Cl.
| | |
|---|---|
| *F16L 55/11* | (2006.01) |
| *F16L 13/16* | (2006.01) |
| *F16L 37/088* | (2006.01) |
| *F16L 27/08* | (2006.01) |
| *B60K 1/00* | (2006.01) |
| *G01L 19/00* | (2006.01) |
| *F16L 37/38* | (2006.01) |

(52) U.S. Cl.
CPC ................ *F16L 55/11* (2013.01); *B60K 1/00* (2013.01); *F16L 13/163* (2013.01); *F16L 27/0845* (2013.01); *F16L 37/0885* (2019.08); *F16L 37/38* (2013.01); *F16L 55/1141* (2013.01); *G01L 19/0007* (2013.01); *F16L 2201/30* (2013.01)

(58) Field of Classification Search
CPC ....... F16L 55/11; F16L 13/163; F16L 55/1141
See application file for complete search history.

(56) References Cited

U.S. PATENT DOCUMENTS

| | | |
|---|---|---|
| 4,423,892 A | 1/1984 | Bartholomew |
| 4,524,995 A | 6/1985 | Bartholomew |
| 4,541,658 A | 9/1985 | Bartholomew |
| 5,909,901 A | 6/1999 | Zillig et al. |

(Continued)

FOREIGN PATENT DOCUMENTS

| | | | | |
|---|---|---|---|---|
| DE | 29609435 U1 * | 7/1996 | ............... | F24H 9/16 |
| WO | WO-2016003686 A1 * | 1/2016 | ............... | F16L 55/11 |

*Primary Examiner* — James M Hewitt, II
(74) *Attorney, Agent, or Firm* — Simpson & Simpson, PLLC; Michael Nicholas Vranjes

(57) ABSTRACT

A fluid connector comprising a body having a through-bore, a plurality of radially inwardly facing surfaces comprising a first cylindrical surface having a first diameter, a frusto-conical surface adjacent the first cylindrical surface, and a second cylindrical surface adjacent the frusto-conical surface, the second cylindrical surface having a second diameter, wherein the frusto-conical surface is arranged between the first and second cylindrical surfaces, and a plurality of outwardly facing surfaces comprising a first cylindrical surface having a first diameter, and a second cylindrical surface adjacent the first cylindrical surface, the second cylindrical surface having a second diameter, and a deformable tab integrally connected to the body and extending axially from the body.

24 Claims, 16 Drawing Sheets

(56) References Cited

U.S. PATENT DOCUMENTS

| | | | |
|---|---|---|---|
| 7,618,070 | B2 | 11/2009 | Stoll et al. |
| 8,978,992 | B2 | 3/2015 | Zillig et al. |
| 9,098,095 | B2 | 8/2015 | Strzelczyk et al. |
| 9,115,816 | B2 | 8/2015 | Steveley et al. |
| 2003/0080564 | A1* | 5/2003 | Izumi .................. F16L 13/163 285/382 |
| 2008/0001398 | A1 | 1/2008 | Stoll et al. |
| 2008/0011971 | A1 | 1/2008 | Stoll |
| 2009/0025922 | A1 | 1/2009 | Strzelczyk et al. |
| 2010/0224258 | A1 | 9/2010 | Stevely et al. |
| 2011/0061744 | A1 | 3/2011 | Zillig et al. |
| 2013/0037141 | A1 | 2/2013 | Kujawski, Jr. et al. |
| 2013/0180610 | A1* | 7/2013 | McGowan .............. F16L 55/11 137/613 |
| 2015/0145240 | A1 | 5/2015 | Kujawski et al. |

\* cited by examiner

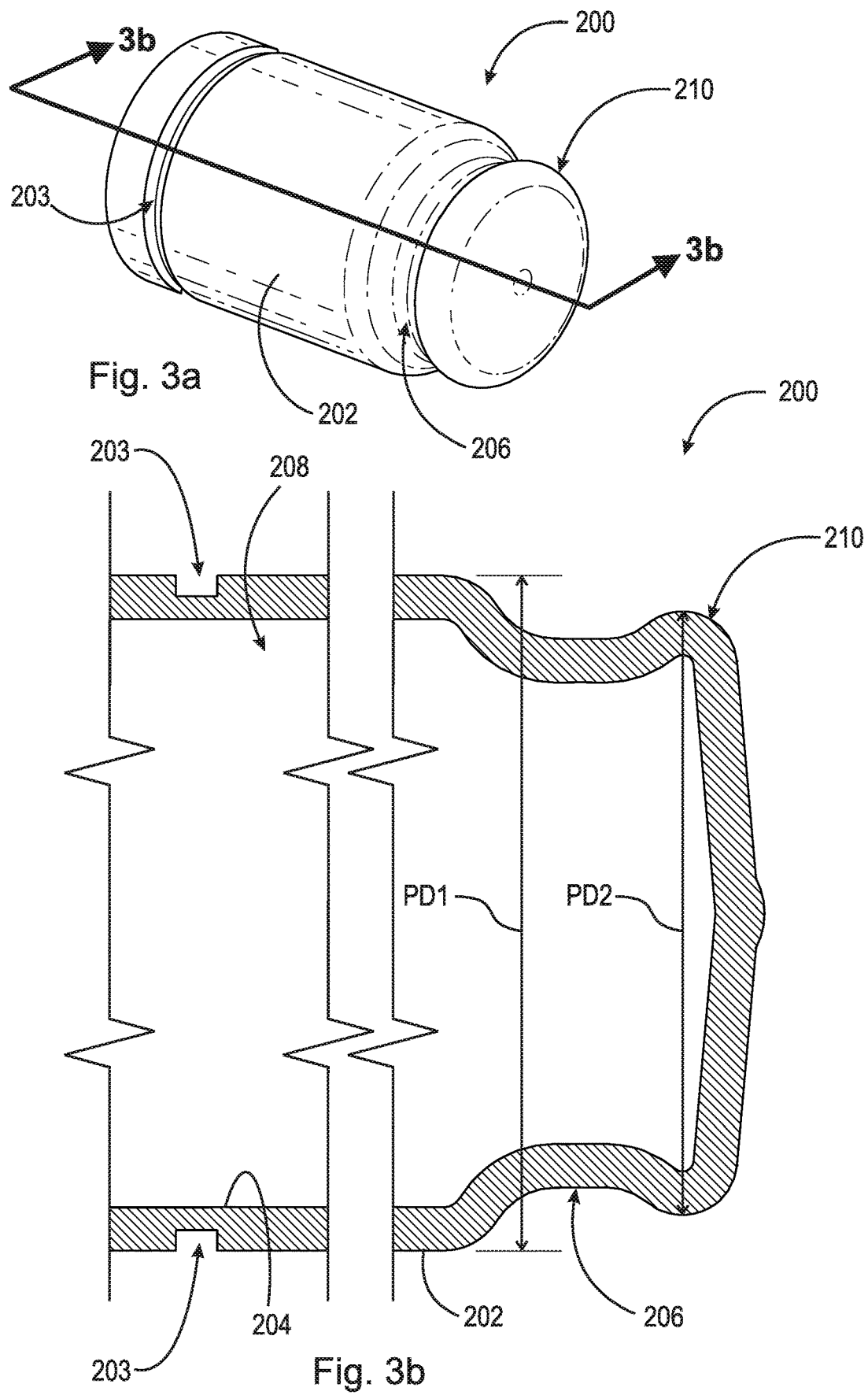

FLUID CONNECTOR HAVING A DEFORMABLE TAB AND PLUG/CONNECTOR ASSEMBLY

CROSS-REFERENCE TO RELATED APPLICATIONS

This application claims the benefit under 35 U.S.C. § 119(e) of U.S. Provisional Application No. 62/303,137, filed Mar. 3, 2016, which application is incorporated herein by reference in its entirety.

FIELD OF THE INVENTION

The invention relates generally to a fluid connector, and, more specifically, to a fluid connector with a deformable tab adapted to be crimp-connected to an output port of a fluid receiving device in such a way as to reduce possible leak paths in the fluid circuit. The invention also relates to an assembly of the fluid connector and a plug, arranged to permit shipment of the connector with a seal.

BACKGROUND OF THE INVENTION

Fluid connectors are integral components for many applications, and especially for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors.

Fluid connectors are typically configured in a fixed orientation with respect to inlet and outlet, regardless of the vehicle in which they are used, regardless of what components they are intended to connect, and regardless of where those components may be located in different vehicles. This fixed, rigid configuration causes complications during operation due to vibrations from the engine transmitted to components located in the engine bay. If a fluid hose is vibrated in excess, this can place excessive stress and strain on the connection between the fluid connector and the fluid hose, causing the connection to become weak. Additionally, the connection between the fluid connector and fluid hose may leak fluid due to an improper fit which, in turn, could cause excessive fluid loss in critical components such as the engine, causing overheating and possible damage if not discovered and fixed.

Additionally, as the size and weight of automobiles shrink, so do the components within the vehicle. In order to reduce weight many of the components which are traditionally made of metal such as aluminum or steel are now being manufactured from plastic.

Unfortunately, plastic is not as robust as metal and is prone to failure around sealing hubs due to stress concentrations and strength of the plastic itself. Moreover, similar problems exist for automobile components made of materials other than plastic that are more lightweight than metal.

Thus, there has been a long-felt need for a fluid connector which can be secured to a sealing hub and provide a robust connection between a tubular connector and a hub which reduces the leak paths between the components.

BRIEF SUMMARY OF THE INVENTION

The present invention broadly comprises a fluid connector comprising a body having a through-bore, a plurality of radially inwardly facing surfaces including a first cylindrical surface having a first diameter, a frusto-conical surface adjacent the first cylindrical surface, and a second cylindrical surface adjacent the frusto-conical surface, the second cylindrical surface having a second diameter, wherein the frusto-conical surface is arranged between the first and second cylindrical surfaces, and a plurality of outwardly facing surfaces including a first cylindrical surface having a first diameter, and a second cylindrical surface adjacent the first cylindrical surface, the second cylindrical surface having a second diameter, and a deformable tab integrally connected to the body and extending axially from the body.

Additionally, the present invention broadly includes a fluid connector assembly comprising a hub having a raised lip, a fluid connector comprising a body having a through-bore and a deformable tab integrally connected to the body and extending axially from the body, a sealing member gland formed between the hub and the fluid connector when the hub is arranged within the through-bore of the fluid connector, and a sealing member arranged within the sealing member gland.

Even further, the present invention broadly includes a fluid connector assembly comprising a body having a through-bore forming an inner surface, and a shoulder extending radially inward from the inner surface, a plug arranged within the through-bore of the body, and a sealing member concentrically arranged on the plug.

A primary object of the invention is to provide a fluid connector which can be secured to a plastic sealing hub and provide a robust connection between a tubular connector and a plastic component. A secondary object of the invention is to provide a fluid connector which can be secured to a sealing hub and provide a robust connection between a tubular connector and a fluid transfer component. Additionally, an object of the present invention is to reduce the leak paths between the tubular connector and the component and to allow for ease of shipping the connector with a sealing member secured to a removable plug in order to prevent contamination of the sealing member until assembly is completed.

These and other objects, features and advantages of the present invention will become readily apparent upon a review of the following detailed description of the invention, in view of the drawings and appended claims.

BRIEF DESCRIPTION OF THE DRAWINGS

The nature and mode of operation of the present invention will now be more fully described in the following detailed description of the invention taken with the accompanying figures, in which:

FIG. 3a is a perspective view of a first embodiment of plug 200;

FIG. 3b is a cross-sectional view of plug 200 taken generally along line 3b-3b;

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention. For the purposes of describing the present invention, the terms "deform" and "deformation" should be understood to mean "to alter an object's form or shape; to change something so that it is no longer its original shape." "Deform" and "deformation" could include, but are not limited to, certain processes such as crimping, stamping, forging, rolling, drawing, die forming, extruding, spinning, flange forming, and recessing.

Figure 1:
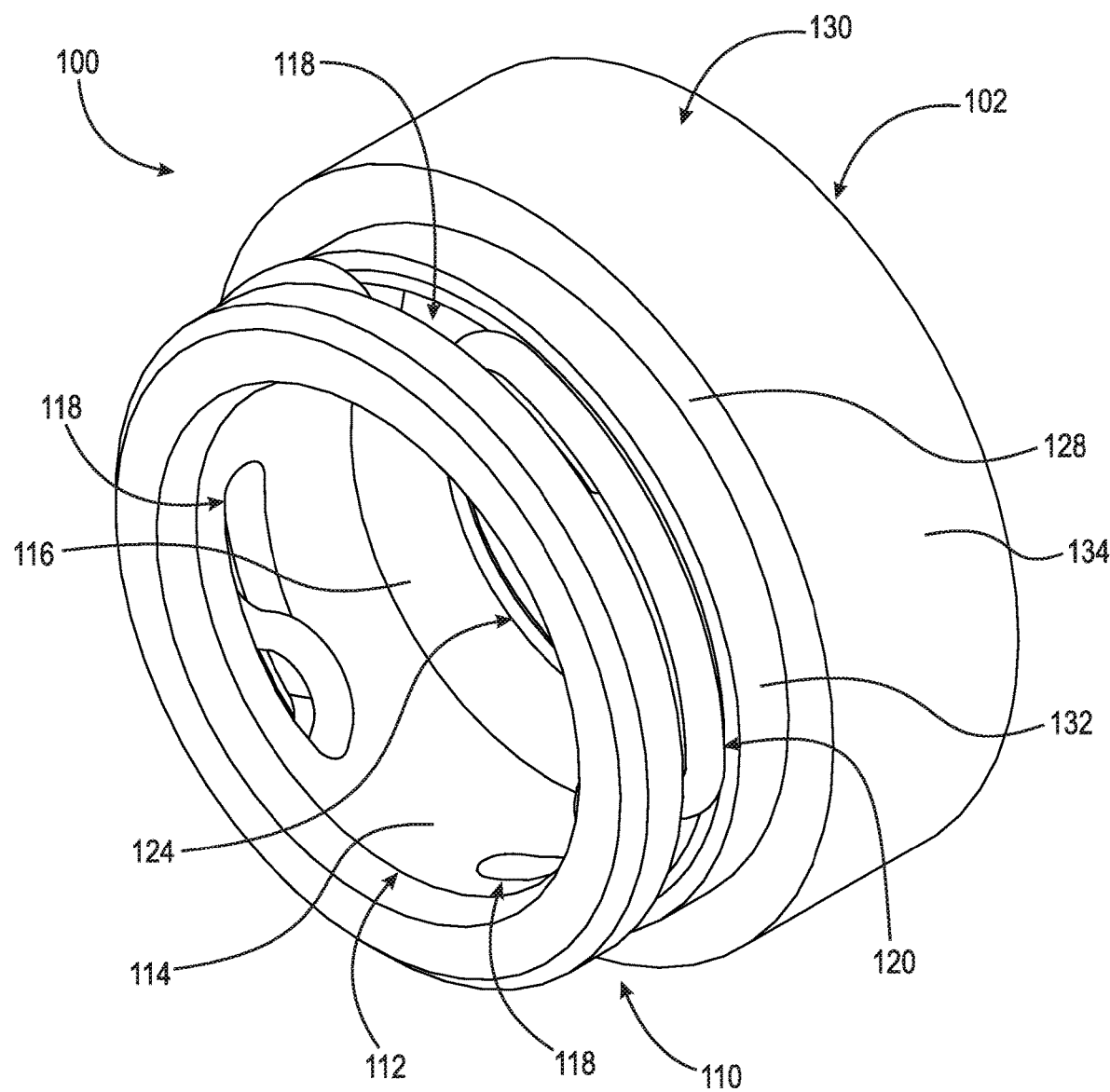
FIG. 1 is a front perspective view of fluid connector 100.
Figure 2:
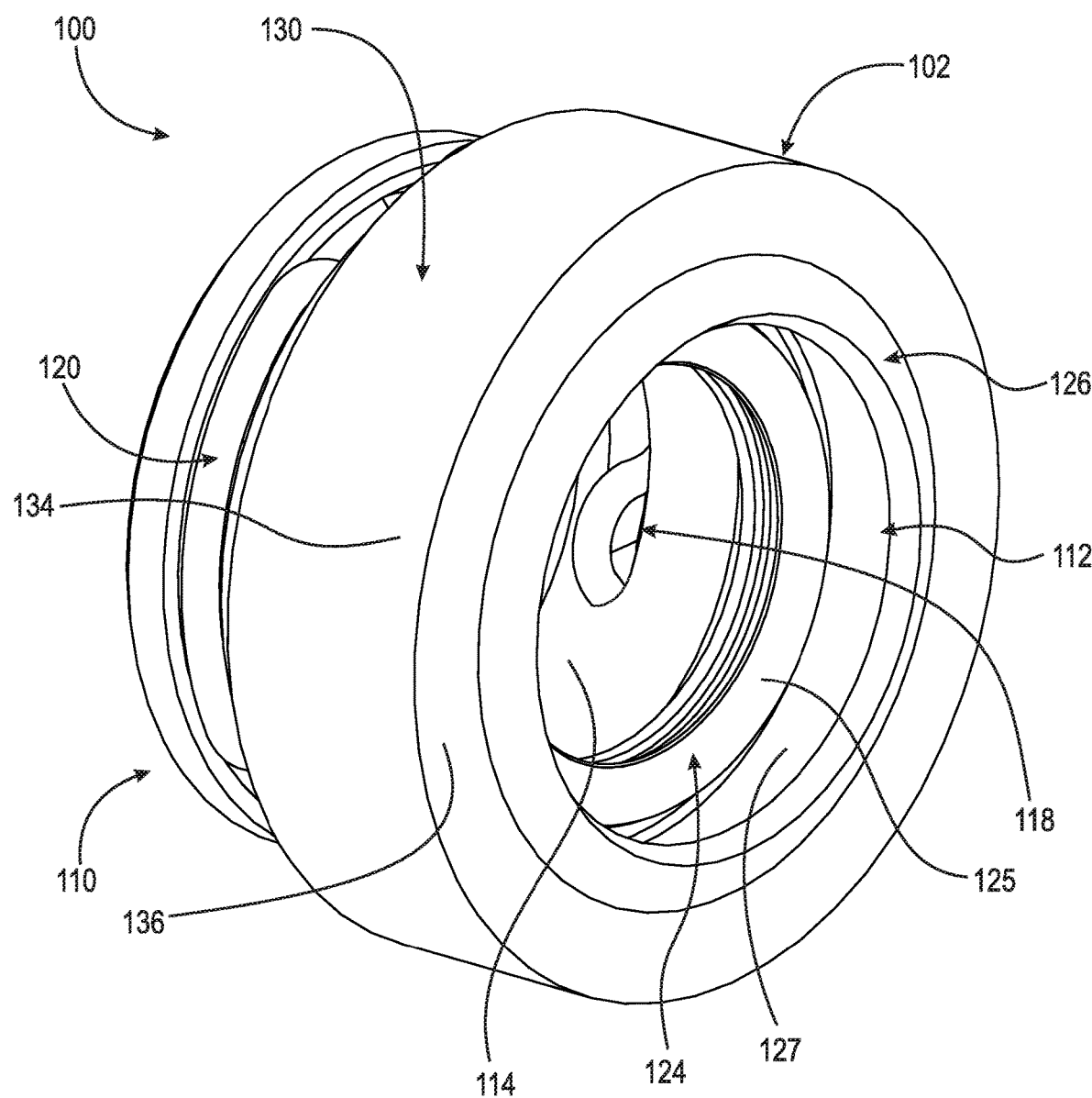
FIG. 2 is a rear perspective view of fluid connector 100.

Adverting now to the figures, FIG. 1 and FIG. 2 are front and rear perspective views of fluid connector 100, respectively. Fluid connector 100 broadly includes body 102, snap ring section 110, through-bore 112, inner surface 114, frusto-conical surface 116, snap ring apertures 118, snap ring 120, inner shoulder 124, shoulder surface 125, tab 126, inner surface 127, outer surface 128, outer shoulder 130, outer surface 132, outer surface 134, and outer surface 136. Inner surface 114 and inner surface 127 are radially inwardly facing cylindrical surfaces. Additionally, outer surface 132 and outer surface 134 are radially outwardly facing cylindrical surfaces. Frusto-conical surface 116 is adjacent to and arranged between inner surface 114 and inner surface 127. Through-bore 112 is arranged within body 102 and allows for a fluid (not shown) to pass through fluid connector 100 when secured to fluid connector assembly 400 (shown in FIG. 5). Snap ring section 110 includes snap ring 120 arranged on outer surface 132 and passes through body 102 and inner surface 114 via apertures 118. Shoulder 124 is concentrically arranged within through-bore 112 and forms sealing gland 325 when secured to hub 300 (shown in FIG. 6). Shoulder 124 includes frusto-conical surface 116 forming a frusto-conical surface with through-bore 112. Tab 126 extends axially from body 102 and is circumferentially continuous and adjacent to outer surface 134. Outer surface 128 and outer shoulder 130 allow for the deformation of tab 126 without damaging fluid connector 100.

FIG. 3a and FIG. 3b are a perspective view and a cross-sectional view, respectively, of a first embodiment of plug 200. Plug 200 includes outer surface 202, inner surface 204, indent 206, cavity 208, and tab 210. Indent 206 is a circumferentially arranged groove on plug 200 which allows plug 200 to secure a sealing member 330 to outer surface 202 (shown in FIG. 6). Plug 200 has a diameter PD1 and a diameter PD2 where diameter PD1 is larger than diameter PD2. In a preferred embodiment, plug 200 is manufactured from a deformable material such as rubber or plastic. Additionally, plug 200 could be manufactured in order to seal through-bore 112 of fluid connector 100 in order to pressure test a device which fluid connector 100 is secured to. A preferred embodiment including a sealing feature for plug 200 is groove 203. Groove 203 is circumferentially arranged on outer surface 202. Snap ring 120 (shown in FIG. 7) would engage groove 203 and prevent plug 200 from being forced out of fluid connector 100. In order to remove plug 200 from fluid connector 100, snap ring 120 must be manually deformed in order to be removed from groove 203.

Figures 3C, 3D:
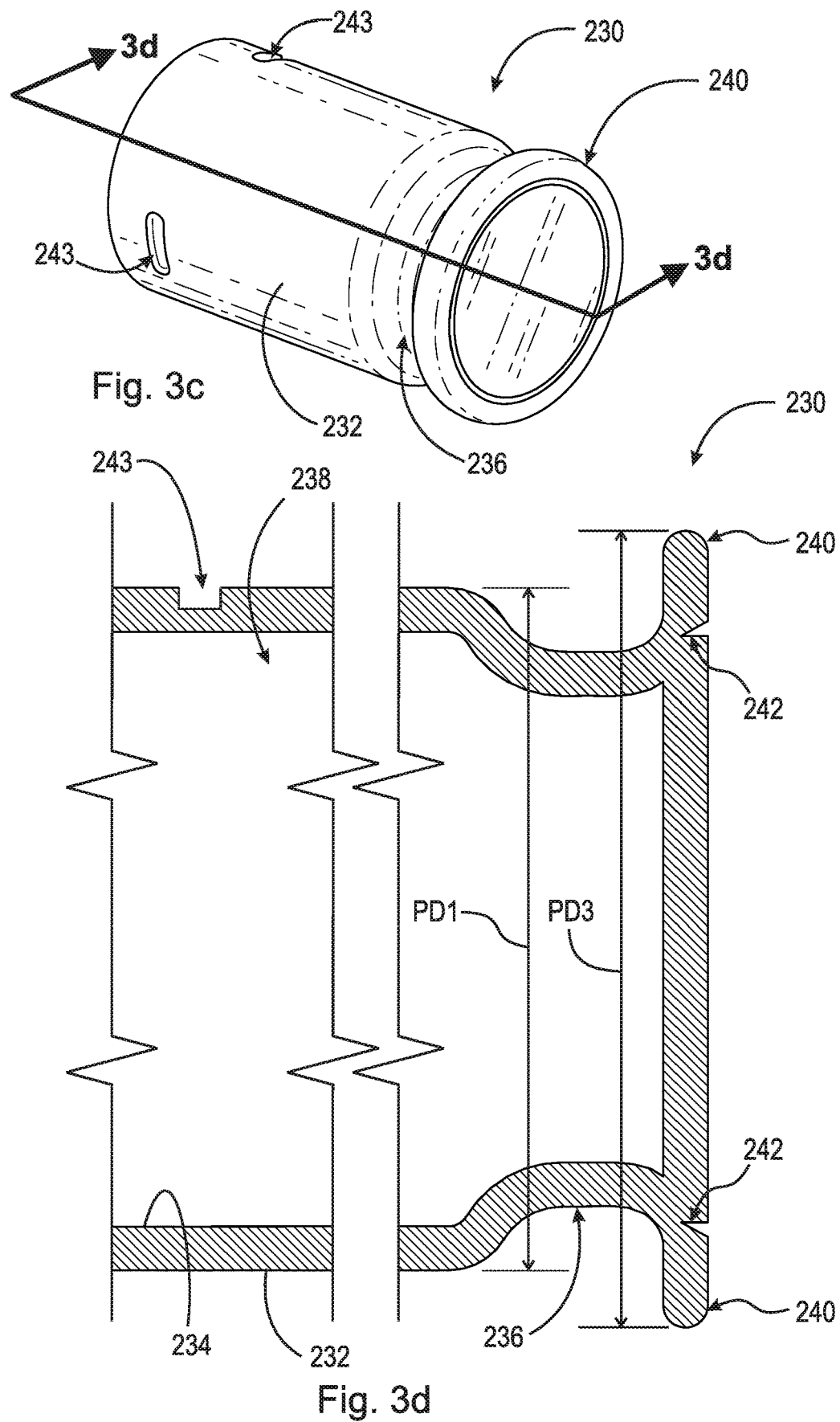
FIG. 3c is a perspective view of a second embodiment of plug 230.
FIG. 3d is a cross-sectional view of plug 230 taken generally along line 3d-3d.

FIG. 3c and FIG. 3d are a perspective view and a cross-sectional view, respectively, of a second embodiment of plug 230. Plug 230 includes outer surface 232, inner surface 234, indent 236, cavity 238, tab 240, and channel 242. Indent 236 is a circumferentially arranged groove on plug 230 which allows plug 230 to secure a sealing member 330 to outer surface 232 (shown in FIG. 6). Tab 240 and channel 242 are circumferentially arranged on plug 230. Channel 242 is a continuous groove that extends axially into plug 230. Plug 230 has a diameter PD1 and a diameter PD3 where diameter PD1 is smaller than diameter PD3. When plug 230 is removed from fluid connector 100 (shown in FIG. 1), channel 242 allows tab 240 to deform around a sealing member 330 (shown in FIG. 6). In a preferred embodiment, plug 230 is manufactured from a deformable material such as rubber or plastic. Additionally, plug 230 could be manufactured in order to seal through-bore 112 of fluid connector 100 in order to pressure test a device which fluid connector 100 secures to. A secondary embodiment including a sealing feature for plug 230 are channels 243. Channels 243 are circumferentially arranged on outer surface 232 and are an equal angular distance apart. Snap ring 120 (shown in FIG. 7 would engage channels 243 and prevent plug 200 from being forced out of fluid connector 100. In order to remove plug 230 from fluid connector 100, plug 230 could be rotated to disengage snap ring 120 from channels 243.

Figure 3E:
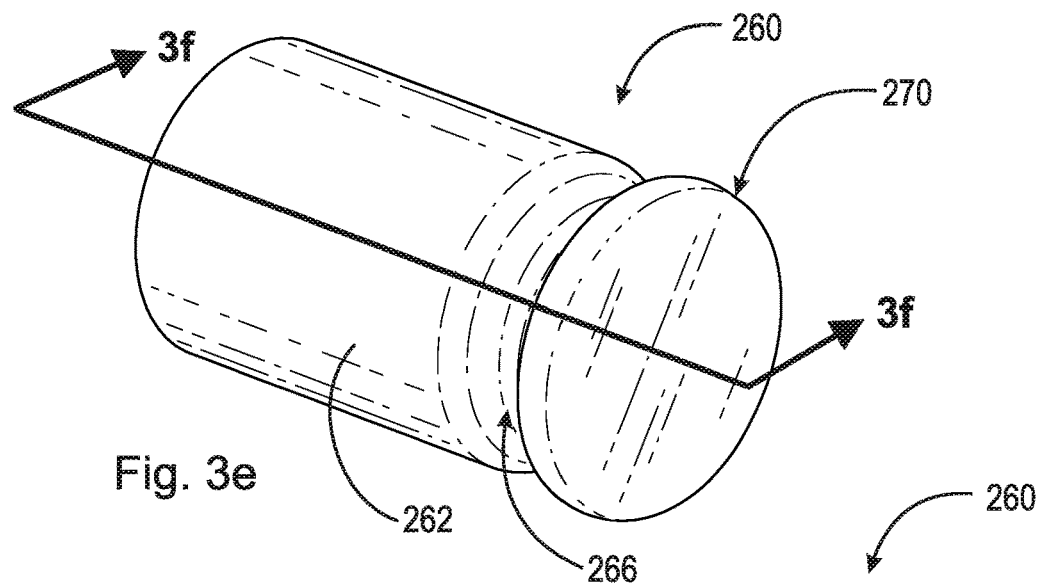
FIG. 3e is a perspective view of a third embodiment of plug 260.
Figure 3F:
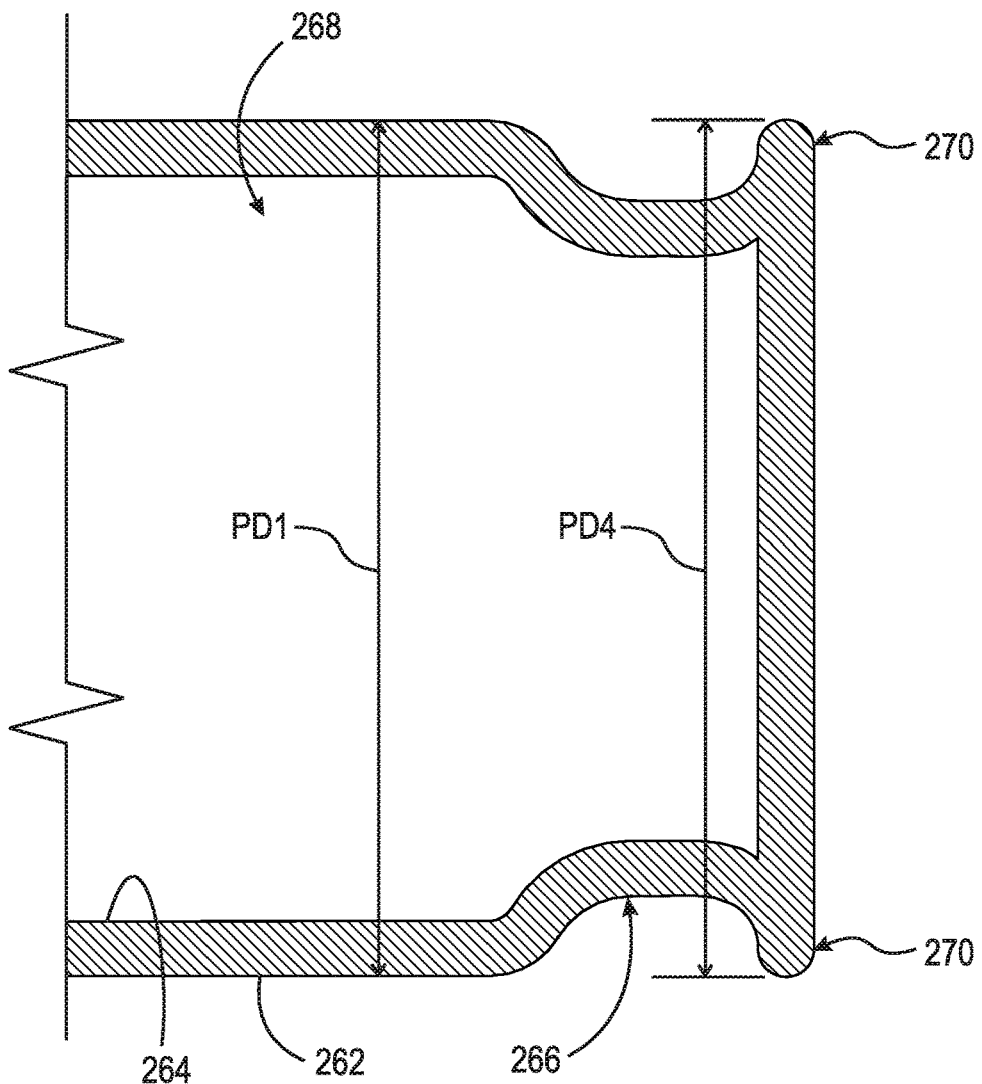
FIG. 3f is a cross-sectional view of plug 260 taken generally along line 3e-3e.

FIG. 3e and FIG. 3f are a perspective view and a cross-sectional view, respectively, of a third embodiment of plug 260. Plug 260 includes outer surface 262, inner surface 264, indent 266, cavity 268, and tab 270. Indent 266 is a circumferentially arranged groove on plug 260 which allows plug 260 to secure a sealing member 330 to outer surface 262 (shown in FIG. 6). Tab 270 is circumferentially arranged on plug 260. In a preferred embodiment, plug 260 is manufactured from a deformable material such as rubber or plastic. Additionally, plug 260 could be manufactured in order to seal through-bore 112 of fluid connector 100 in order to pressure test a device which fluid connector 100 is secured to. It should be appreciated, however, that the use of a either plug 200, 230, or 260 in combination with either groove 203 or channels 243 can be used to seal fluid connector 100 for pressure testing and alignment of sealing member 330 within fluid connector 100 and hub 300.

Figure 4:
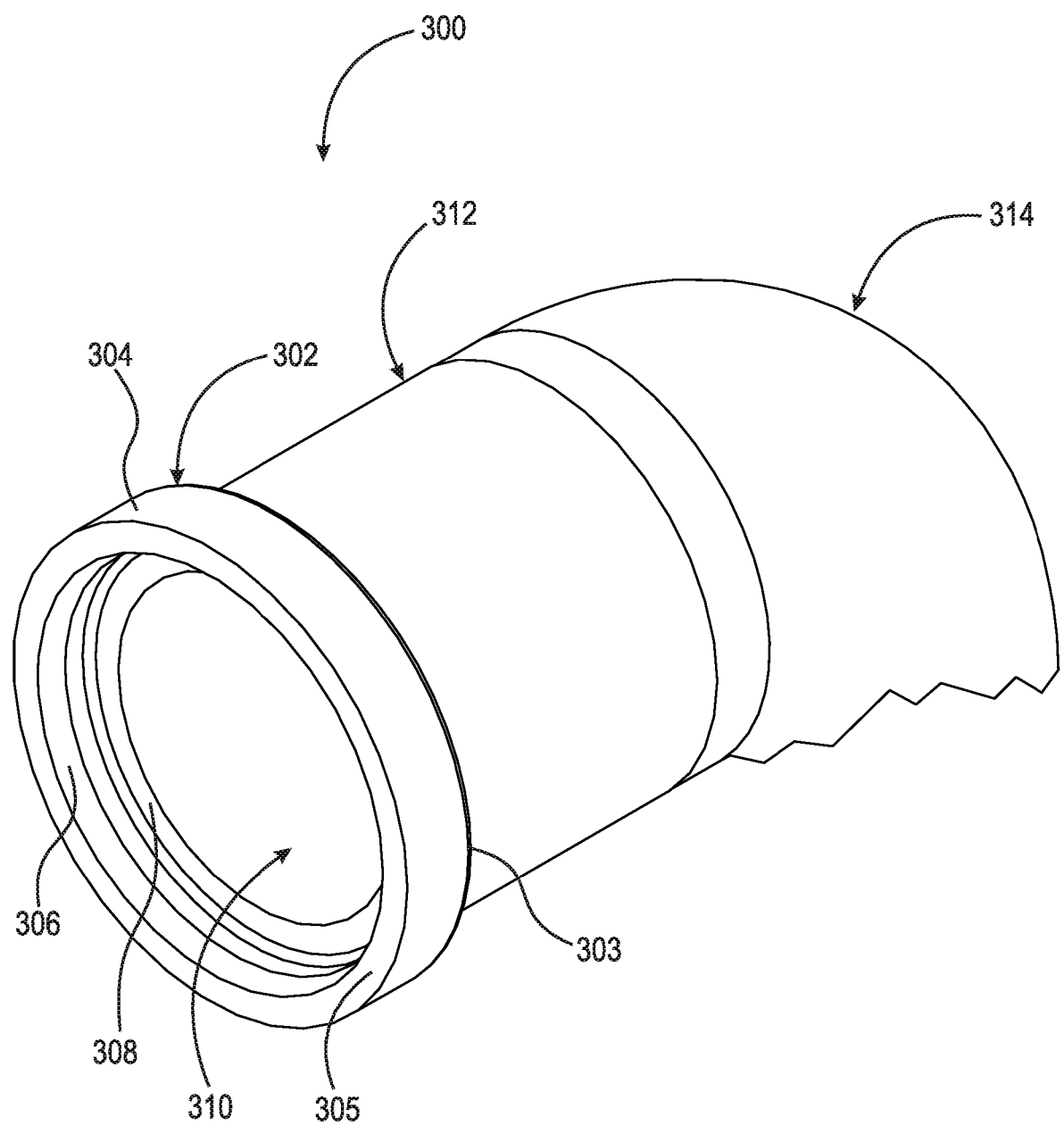
FIG. 4 is a fragmentary perspective view of hub 300.

FIG. 4 is a perspective view of hub 300. Hub 300 broadly includes lip 302, outer surface 303, outer surface 304, outer surface 305, inner surface 306, inner surface 308, through-bore 310, body 312, joint 314, extension 315 (shown in FIG. 5), and connector 316 (shown in FIG. 5). Through-bore 310 is arranged on body 312 and allows for a fluid (not shown) to pass through body 312 when secured to fluid assembly 400. Lip 302, along with shoulder 124 of fluid connector 100 (shown in FIG. 2) form sealing gland 325 (shown in FIG. 6). Additionally, inner surface 306 and inner surface 308 aid in the formation of sealing gland 325 and engage sealing member 330 (shown in FIG. 7). Lip 302 also allows for the securement of fluid connector 100 via tab 126 which is deformable (shown in FIG. 7). In a preferred embodiment, hub 300 is manufactured from a rigid material such as plastic or metal. It should be appreciated, however, that any suitable material could be used to construct hub 300. For example, materials which could be considered suitable are nylon, rubber, carbon fiber, etc.

Figure 5:
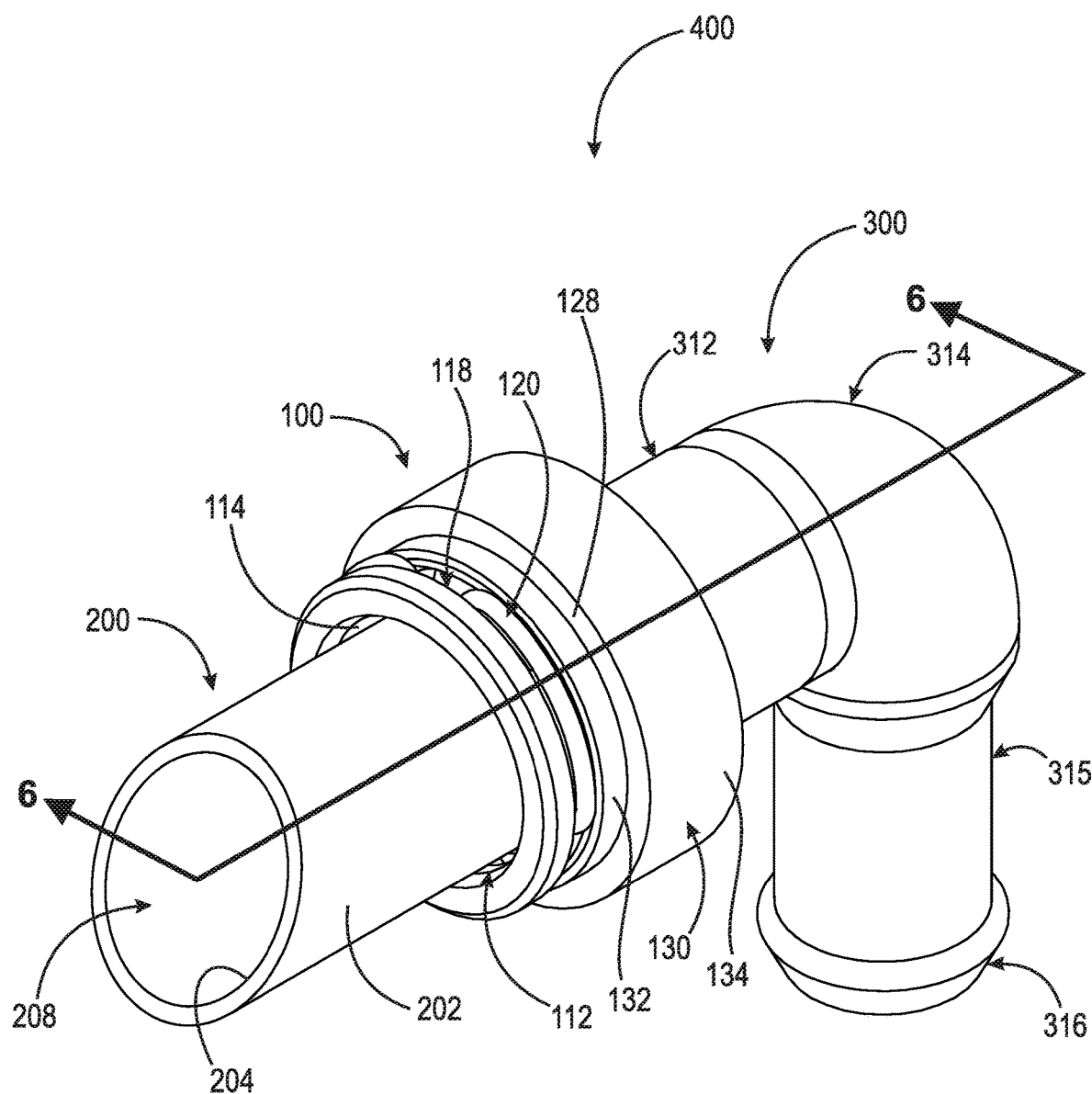
FIG. 5 is a perspective view of fluid connector assembly 400.

FIG. 5 is a perspective view of fluid connector assembly 400. Plug 200 is secured within fluid connector 100 in order to protect sealing member 330 from damage and contamination during shipping and assembly of fluid connector 100. Plug 200 also serves as an alignment tool during the crimping process to ensure sealing member 330 is not twisted or misaligned. If sealing member 330 were misaligned at the time of crimping, the seal formed would not be effective in preventing leaks. Plug 200 is concentrically arranged within through-bore 112 of fluid connector 100. In this arrangement, plug 200 could be utilized for pressure testing of fluid connector assembly 400 prior to securement to another component. Joint 314, extension 315, and connector 316 secure fluid connector assembly 400 to another fluid component, for example a thermal relief valve. It should be appreciated, however, that hub 300 could be integral with a fluid component which allows fluid connector 100 to secure directly to the component, eliminating joint 314, extension 315, and connector 316.

Figure 6A:
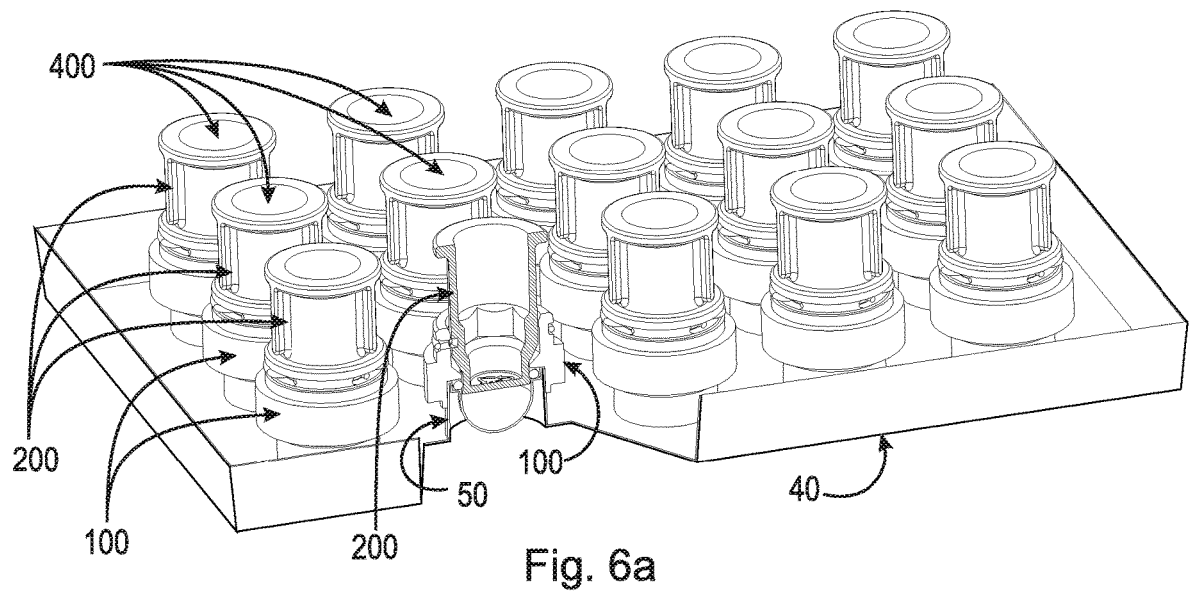
FIG. 6a is a perspective view of a plurality of fluid connector assemblies 400 including cap 50 arranged on tray 40.
Figure 6B:
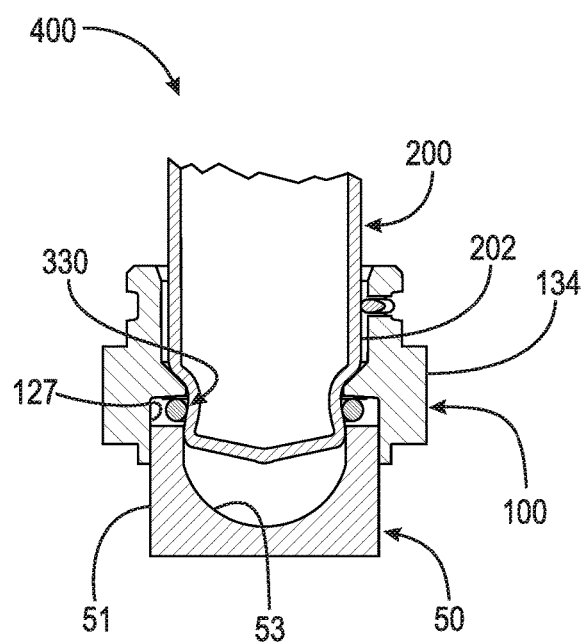
FIG. 6b is an enlarged cross-sectional view of FIG. 6a of fluid connector assembly 400 including cap 50.

FIG. 6a is a perspective view of a plurality of fluid connector assemblies 400 including cap 50 arranged on tray 40 and FIG. 6B is a cross-sectional view of fluid connector assembly 400 including cap 50. Once plug 200 is inserted into fluid connector 100 and sealing member 330 is arranged on plug 200, fluid connector assembly 400 is placed on tray 40. Tray 40 includes a plurality of caps 50 which engage with fluid connector 100 in order to protect sealing member 330 from contamination during the shipping and assembly process. When cap 50 is engaged with fluid connector 100, sealing member 330 is enclosed by cap 50, fluid connector 100, and plug 200. In a preferred embodiment, inner surface 127 of fluid connector 100 engages outer surface 51 of cap 50. This engagement is arranged to ensure fluid connector 100 does not become dislodged from cap 50 while being shipped. Additionally, outer surface 202 of plug 200 engages inner surface 53 of cap 50 to keep plug 200 and sealing member 330 aligned within fluid connector 100. In a secondary embodiment, inner surface 53 of cap 50 could be arranged to secure along outer surface 134 of fluid connector 100.

Figure 7:
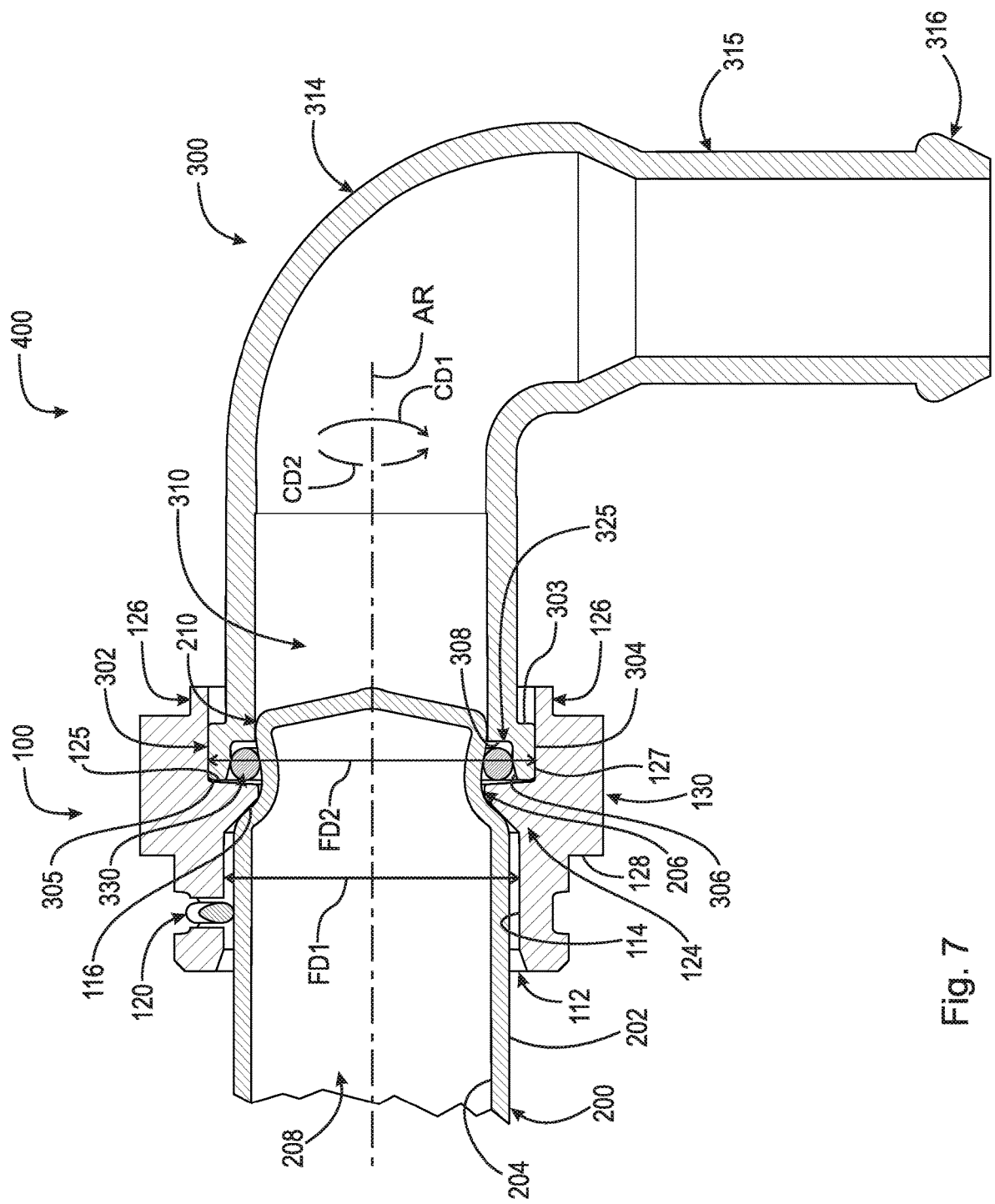
FIG. 7 is a fragmentary cross-sectional view of fluid connector assembly 400 showing tab 126 prior to deformation taken generally along line 6-6 in FIG. 5.

FIG. 7 a cross-sectional view of fluid connector assembly 400 showing tab 126 prior to deformation. Fluid connector 100 is arranged on hub 300 by lip 302 being inserted within through-bore 112. Plug 200 is inserted into fluid connector 100 prior to the assembly process and secures sealing member 330 within fluid connector 100. In a preferred embodiment, sealing member 330 is deformable, such as a rubber O-ring. It is important to note, however, that the use of different sealing members is possible and considered within the scope of the invention as claimed. For example, a valve or cup seal could be used in place of an O-ring. Sealing member 330 secures to plug 200 via an interference fit within indent 206 of plug 200. In a preferred embodiment, snap ring 120 engages outer surface 202 of plug 200 to provide additional securement of plug 200 within fluid connector 100. The arrangement of plug 200 and sealing member 330 does not interfere with the insertion of hub 300 into fluid connector 100. Outer surface 305 abuts shoulder surface 125 to align hub 300 within fluid connector 100. Additionally, inner surface 127 abuts outer surface 304 to secure hub 300 within fluid connector 100. Inner surface 308 and shoulder surface 125 abut sealing member 330 to aid in the formation of sealing gland 325 which sealing member 330 is arranged within. Fluid connector 100 includes diameter FD1 and diameter FD2, which are both relative to the size of the connectors that fluid connector 100 will be secured to. In a preferred embodiment, diameter FD1 is smaller than diameter FD2. It should be appreciated, however, that the use of different sized diameters is possible and considered within the scope of the invention as claimed. For example, diameter FD1 can be manufactured to be larger than diameter FD2, or both diameter FD1 and diameter FD2 could be of identical size.

Figure 8:
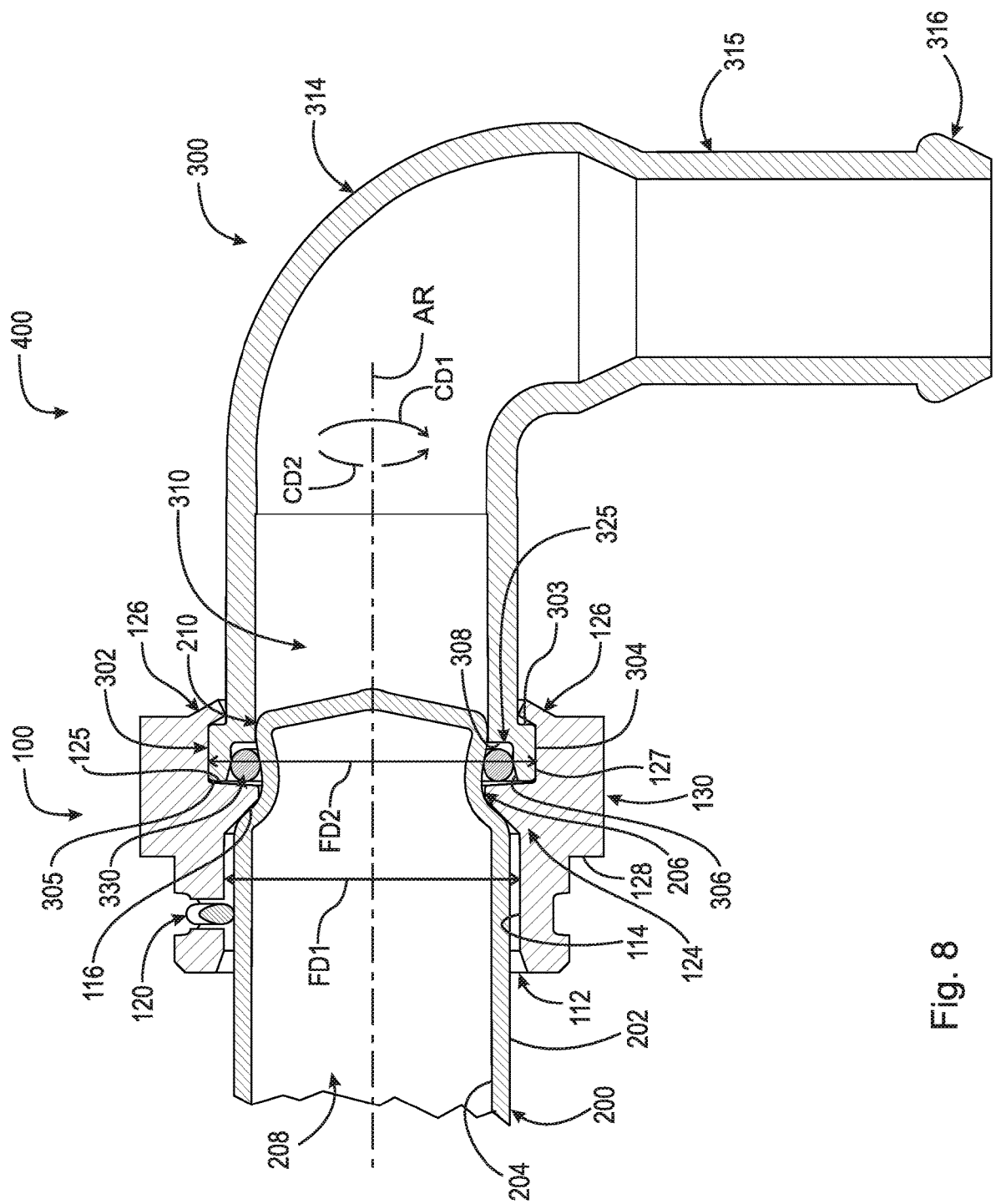
FIG. 8 is a fragmentary cross-sectional view of fluid connector assembly 400 showing tab 126 deformed to secure fluid connector 100 to hub 300 taken generally along line 6-6 in FIG. 5.

FIG. 8 is a cross-sectional view of fluid connector assembly 400 showing tab 126 deformed to secure fluid connector 100 to hub 300. Tab 126 is deformed radially inwardly via a crimping process. It should be appreciated, however, that the use of different deformation processes can be used and should be considered within the scope of the invention as claimed. The deformation process is such that fluid connector 100 and hub 300 become secured together but, in certain applications where it is beneficial, fluid connector 100 can rotate in circumferential direction CD1 or circumferential direction CD2 relative to hub 300 about axis of rotation AR to prevent excessive wear on tab 126 or sealing member 330. Tab 126 abuts outer surface 303 when deformed and prevents fluid connector 100 from separating from hub 300 in an axial direction. Additionally, the securement of fluid connector 100 and hub 300 forms sealing gland 325 which sealing member 330 is arranged within.

Figure 9:
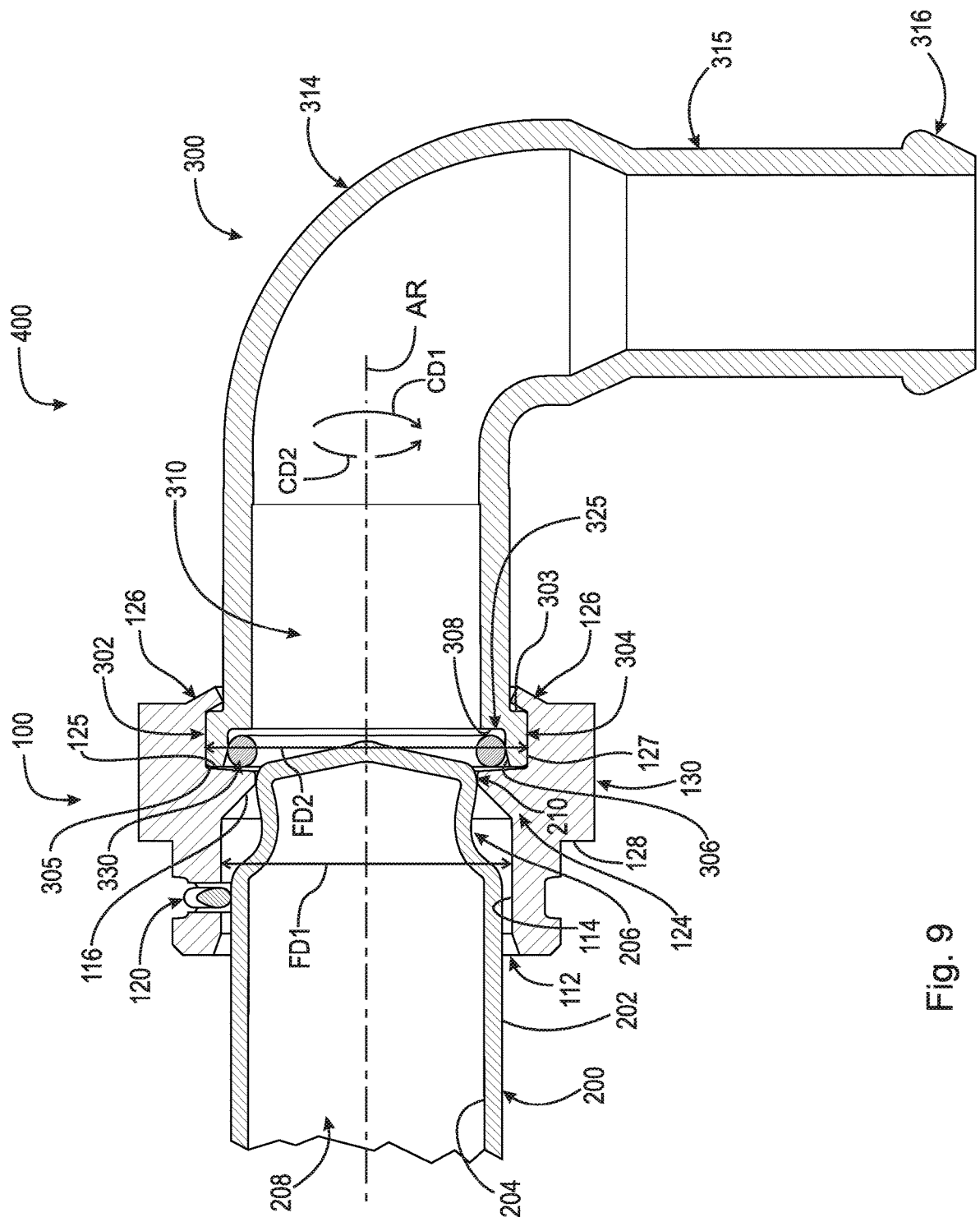
FIG. 9 is a fragmentary cross-sectional view of fluid connector assembly 400 showing plug 200 being removed from fluid connector 100, taken generally along line 6-6 in FIG. 5.

FIG. 9 is a cross-sectional view of fluid connector assembly 400 with plug 200 being removed from fluid connector 100. As plug 200 is removed from fluid connector 100, tab 210 deforms in order to maneuver around sealing member 330 and shoulder 124. As plug 200 is moved axially, sealing member 330 is induced to move with plug 200 due to sealing member 330 being secured to plug 200. Shoulder 124 prevents sealing member 330 from being dislodged within fluid connector 100 due to the removal of plug 200.

Figure 10:
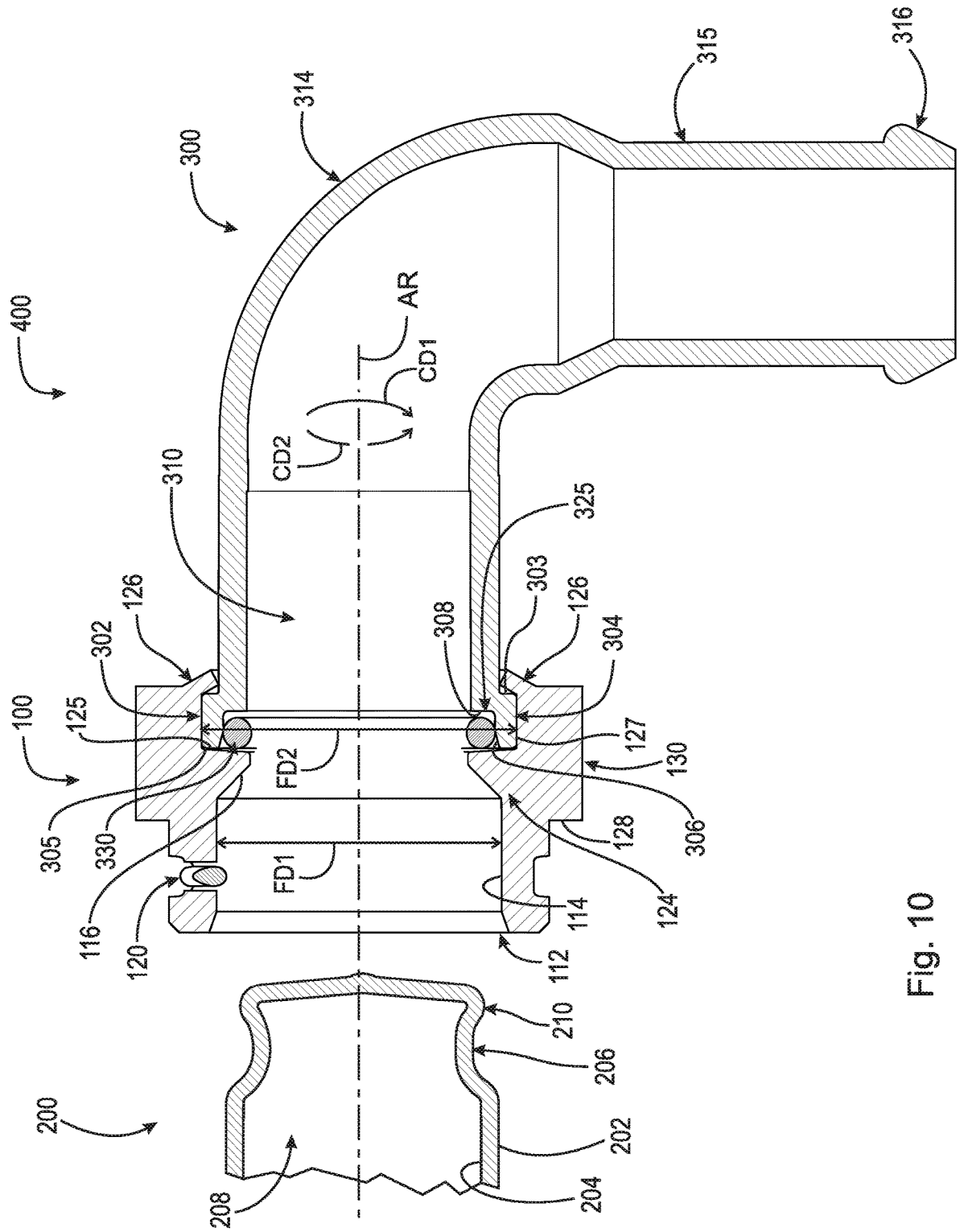
FIG. 10 is a cross-sectional view of fluid connector assembly 400 showing plug 200 fully removed from fluid connector 100, taken generally along line 6-6 in FIG. 5.

FIG. 10 is a cross-sectional view of fluid connector assembly 400 with plug 200 fully removed from fluid connector 100. Once plug 200 is fully removed, tubular connector 500 can be inserted into fluid connector 100 (shown in FIG. 11). Prior to the forming of sealing gland 325, sealing member was held in place solely by plug 200. Once sealing gland 325 is formed by the joining of fluid connector 100 and hub 300, plug can be removed without dislodging sealing member 330. This arrangement also aids in the manufacturing of fluid connector assembly 400 due to the fact that a sealing member, such as an O-ring, does not have to be inserted into an internal groove but can easily be inserted prior to assembly. Additionally, the forming of sealing gland 325 helps in stemming material build up within sealing gland 325 prior to assembly and also during operation fluid connector assembly 400.

Figure 11:
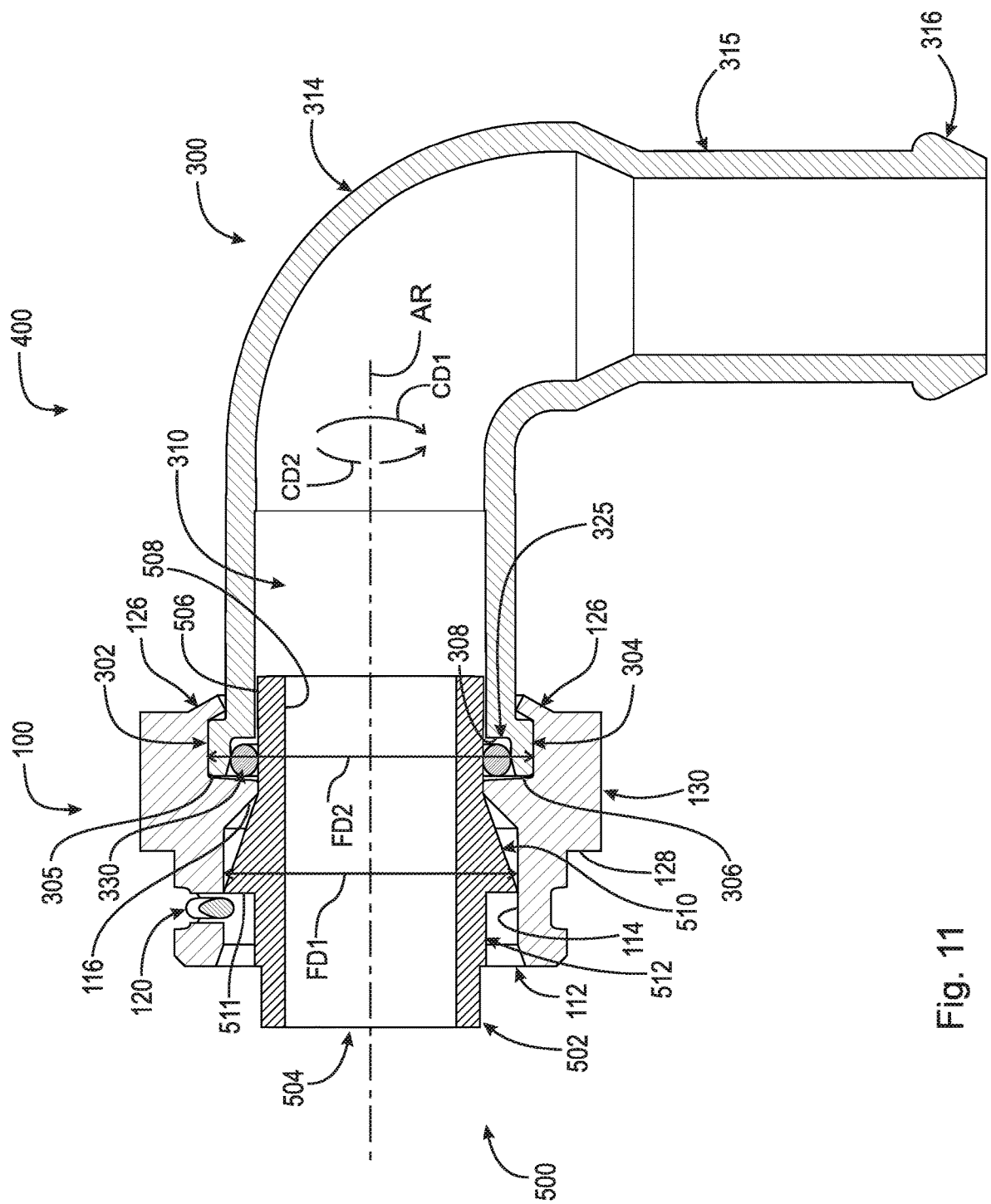
FIG. 11 is a cross-sectional view of fluid connector assembly 400 showing tubular connector 500 inserted into fluid connector assembly 400, taken generally along line 6-6 in FIG. 5.

FIG. 11 is a cross-sectional view of fluid connector assembly 400 with tubular connector 500 inserted into fluid connector assembly 400. Tubular connector 500 is secured to fluid connector 100 via snap ring 120 and shoulder 510. Shoulder surface 511 of shoulder 510 abuts snap ring 120 when tubular connector 500 is full inserted. Through-bore 504 allows a fluid (not shown) to pass through tubular connector 500. Sealing member 330 engages outer surface 506 of tubular connector to seal fluid connector assembly 400 while in operation. Once tubular connector 500 is inserted into fluid connector 100, sealing member 330 is full captive within fluid connector assembly 400. In order to prevent tubular connector 500 from being over inserted within fluid connector, shoulder 124 of fluid connector 100 abuts shoulder 510 of tubular connector 500. Additionally, witness bead 512 allows a user to visually confirm that tubular connector 500 has been fully inserted.

Figure 12:
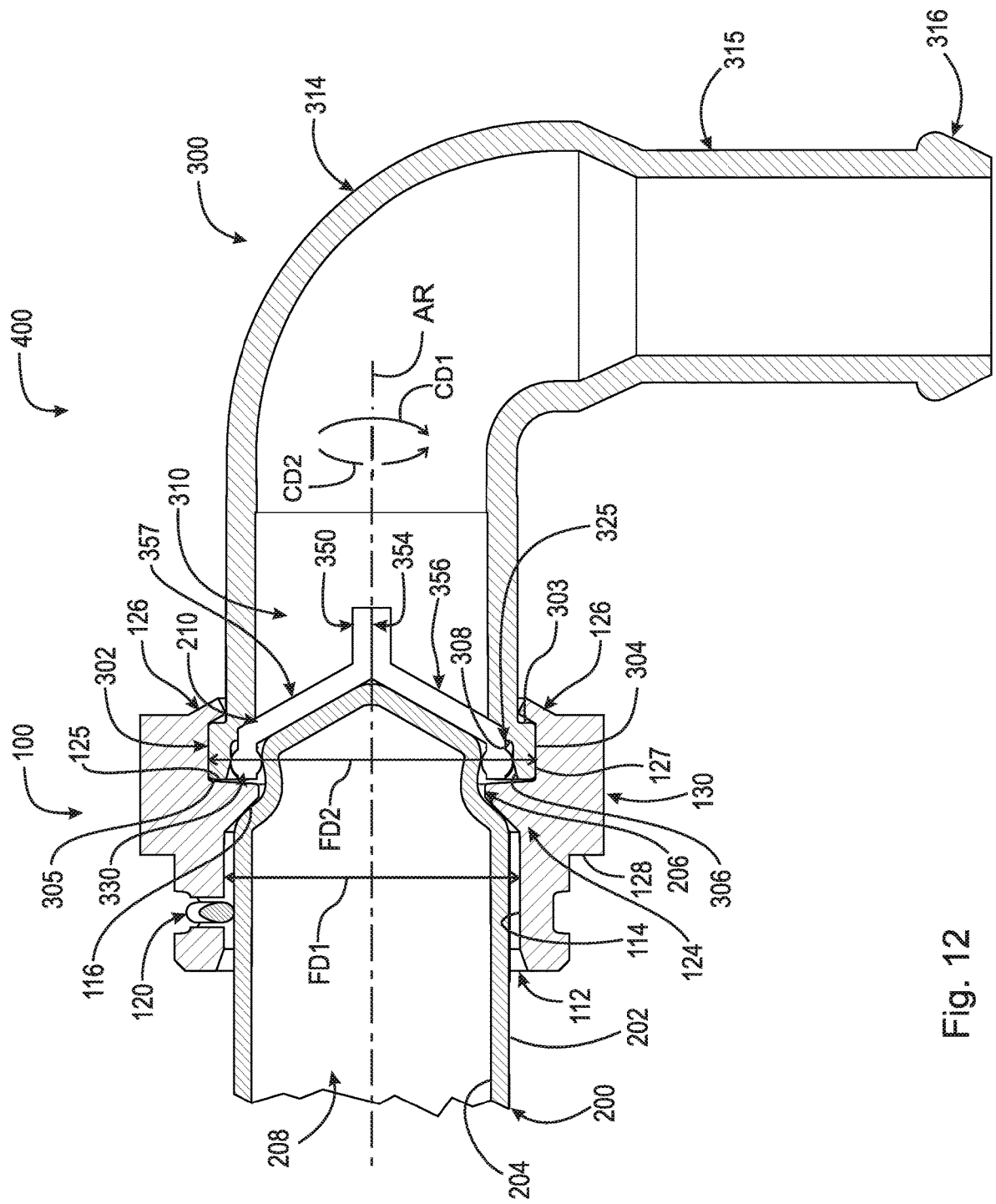
FIG. 12 is a fragmentary cross-sectional view of fluid connector assembly 400 including valve 350, taken generally along line 6-6 in FIG. 5.

FIG. 12 is a cross-sectional view of fluid connector assembly 400 including valve 350 inserted into fluid connector assembly 400. Valve 350 operates identical to sealing member 330 with respect to sealing along tubular connector 500. Valve 350 includes sealing member 352, slit 354, valve arm 356, and valve arm 357. Sealing member 352 is integral to valve 350 and serves the same purpose as sealing member 330 described in the previous embodiment. Valve 350 is arranged within through-bore 112 of fluid connector 100 and prevents the flow of fluid unless tubular connector (shown in FIG. 13) is fully inserted into fluid connector assembly 400.

Figure 13:
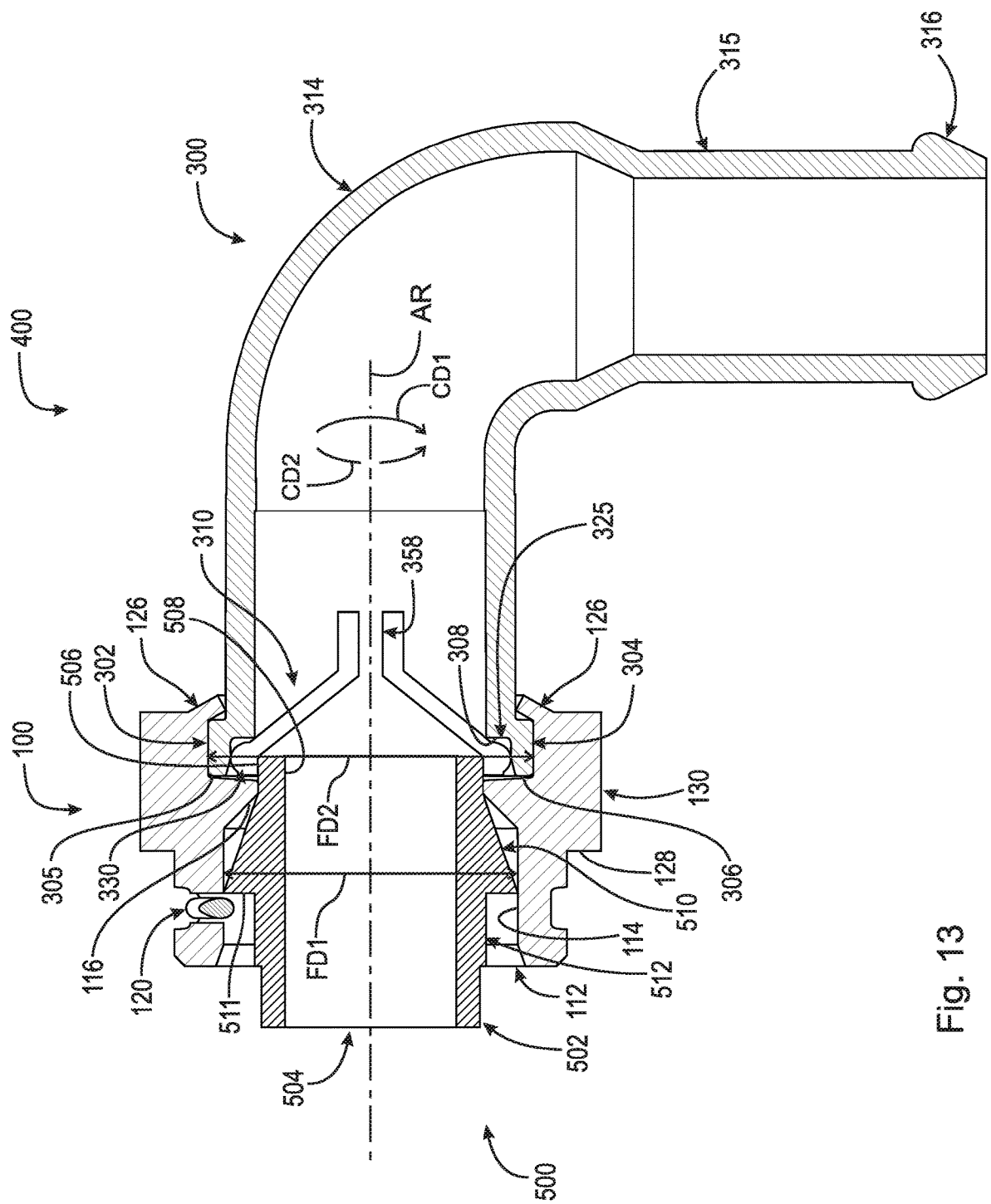
FIG. 13 is a cross-sectional view of fluid connector assembly 400 including valve 350 with tubular connector 500 inserted into fluid connector assembly 400, taken generally along line 6-6 in FIG. 5; and, FIG. 14 is a schematic representation of the assembly process of fluid connector assembly 400.

FIG. 13 is a cross-sectional view of fluid connector assembly 400 including valve 350 with tubular connector 500 inserted into fluid connector assembly 400. Once tubular connector 500 is inserted into fluid connector 100, valve arms 356 and 357 are forced apart and allow slit 354 to form gap 358. The formation of gap 358 allows fluid to flow through fluid connector assembly 400 during operation.

Figure 14:
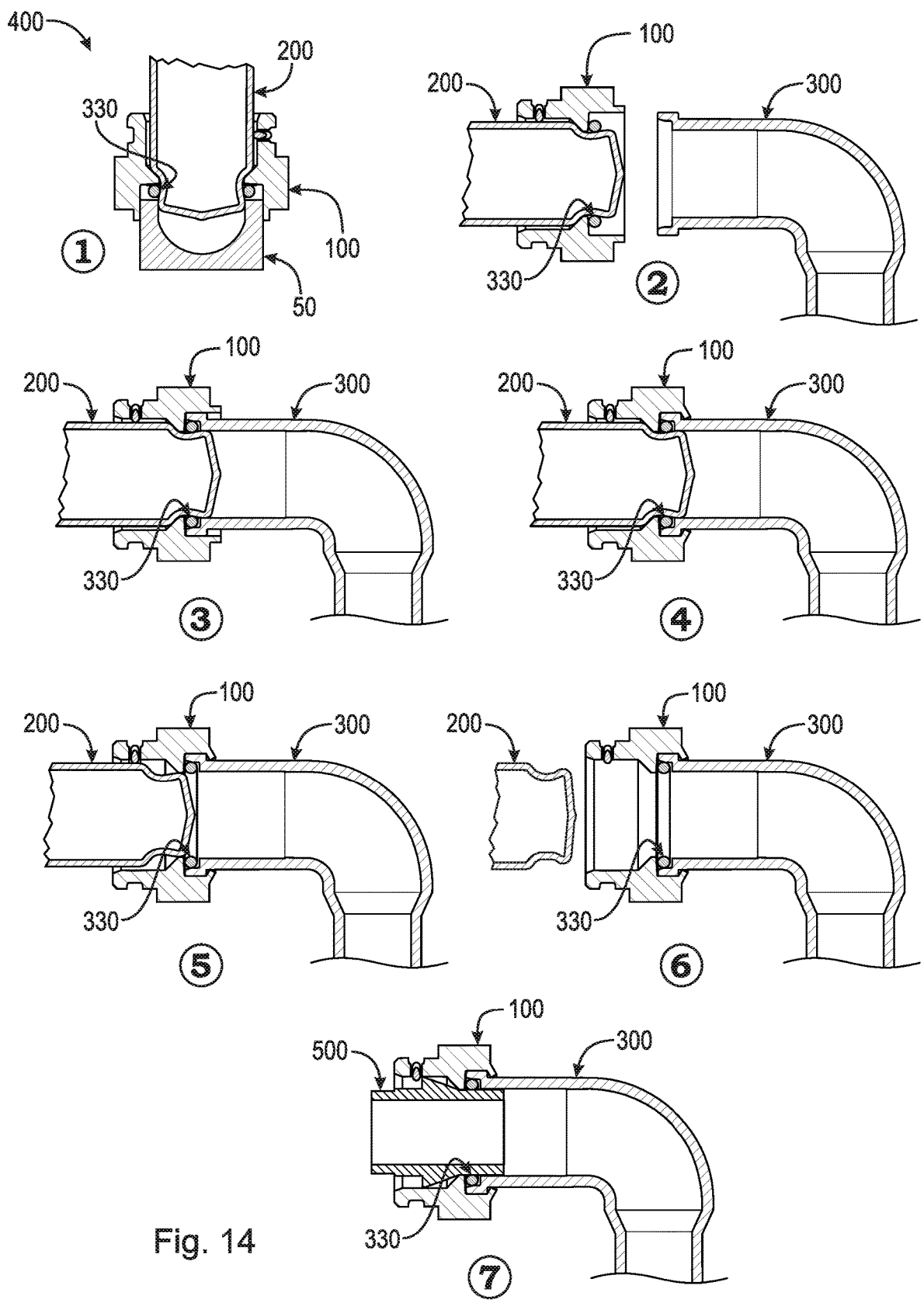

FIG. 14 is a schematic view of the assembly process for fluid connector assembly 400. Step 1 is to secure cap 50 and plug 200 to fluid connector 100 in order to protect sealing member 330 during shipping of fluid connector 100. Step 2 is to remove cap 50 so that hub 300 can be inserted into fluid connector 100. Step 3 is to insert hub 300 into fluid connector 100. In order to insert hub 300 into fluid connector 100, tab 126 of fluid connector 100 cannot be deformed. Step 4 is to deform tab 126 with hub 300 arranged within fluid connector 100. Deformation of tab 126 secures fluid connector 100 to hub 300. It is important to note that even though fluid connector 100 and hub 300 are secured to one another, fluid connector 100 can still rotate relative to hub 300 in certain applications. Step 5 is initiating removal of plug 200 from fluid connector 100. Plug 200 deforms around sealing member 330 and shoulder 124 of fluid connector 100. Shoulder 124 ensures sealing member 330 does not become dislodged during the plug removal process. Step 6 is the full removal of plug 200 from fluid connector 100 allowing for tubular connector 500 to be inserted into fluid connector 100. Step 7 is the insertion of tubular connector 500 into fluid connector 100. Snap ring 120 of fluid connector 100 secures tubular connector 500 within fluid connector 100. It is important to note that tubular connector 500 engages sealing member 330 and seals fluid connector assembly 400 while a fluid (not shown) passes though fluid connector assembly 400.

It will be appreciated that various aspects of the above-disclosed invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 40 tray
50 cap
51 outer surface
53 inner surface
100 fluid connector
102 body
110 snap ring section
112 through-bore
114 inner surface
116 frusto-conical
118 aperture
120 snap ring
124 shoulder
126 tab
127 inner surface
128 outer surface
130 shoulder
132 outer surface
134 shoulder surface
200 plug
202 outer surface
204 inner surface
206 indent
208 cavity
210 tab
230 plug
232 outer surface
234 inner surface
236 indent
238 cavity
240 tab
242 channel
243 channel
260 plug
262 outer surface
264 inner surface
266 indent
268 cavity
270 tab
300 hub
302 lip 303 outer surface
304 outer surface
306 inner surface
308 inner surface
310 through-bore
312 body
314 joint
315 extension
316 connector
325 sealing gland
330 sealing member
350 valve
352 sealing member
354 slit
356 valve arm
357 valve arm
358 gap
400 fluid connector assembly
500 tubular connector
502 body
504 through-bore
506 outer surface
508 inner surface
510 shoulder
511 shoulder surface
512 witness bead
FD1 diameter
FD2 diameter
PD1 diameter
PD2 diameter
PD3 diameter
PD4 diameter
AR axis of rotation
CD1 circumferential direction
CD2 circumferential direction

What is claimed is:

1. A fluid connector, comprising:
 a body comprising:
  a through-bore;
  a plurality of radially inwardly facing surfaces comprising:
   a first cylindrical surface having a first diameter;
   a frusto-conical surface adjacent said first cylindrical surface, said frusto-conical surface extending from the first cylindrical surface radially inward in a first axial direction; and,
   a second cylindrical surface adjacent said frusto-conical surface, said second cylindrical surface having a second diameter, wherein said frusto-conical surface is arranged between said first and second cylindrical surfaces; and,
  a plurality of outwardly facing surfaces comprising:
   a first cylindrical surface; and,
   a second cylindrical surface adjacent said first cylindrical surface; and,
  a deformable tab integrally connected to said body and extending axially from said second cylindrical surface in the first axial direction.

2. The fluid connector recited in claim 1, wherein said tab is circumferentially continuous.

3. The fluid connector recited in claim 1, wherein said tab is adjacent said second outwardly facing cylindrical surface.

4. The fluid connector recited in claim 1, wherein said tab is deformed radially inward.

5. The fluid connector recited in claim 1, further comprising a snap ring.

6. The fluid connector recited in claim 1, wherein said first diameter of said first inwardly facing cylindrical surface is less than said second diameter of said second inwardly facing cylindrical surface.

7. The fluid connector recited in claim 1, wherein said first diameter of said first inwardly facing cylindrical surface is larger than said second diameter of said second inwardly facing cylindrical surface.

8. The fluid connector recited in claim 1, wherein said first diameter of said first inwardly facing cylindrical surface is equal to said second diameter of said second inwardly facing cylindrical surface.

9. A fluid connector assembly, comprising:
 a hub comprising a raised lip including a radially inward facing surface;
 a fluid connector comprising:
  a body comprising a through-bore; and,
  a deformable tab integrally connected to said body and extending axially from said body, said deformable tab operatively arranged to engage a radially outer surface of the raised lip;
 a sealing member gland formed between said hub and said fluid connector when said hub is arranged within said through-bore of said fluid connector; and,
 a sealing member arranged within said sealing member gland and engaged with the radially inward facing surface.

10. The fluid connector assembly recited in claim 9, wherein said tab is deformed to secure said hub to said fluid connector.

11. The fluid connector assembly recited in claim 9, wherein said tab is crimped to secure said hub to said fluid connector.

12. The fluid connector assembly recited in claim 9, wherein said sealing member is an O-ring, a valve, or a cup seal.

13. The fluid connector assembly recited in claim 9, further comprising a tubular connector arranged within the through-bore of said fluid connector.

14. The fluid connector assembly recited in claim 13, wherein said sealing member seals said fluid connector assembly on said tubular connector.

15. The fluid connector assembly recited in claim 9, wherein said fluid connector is operatively arranged to rotate relative to said hub.

16. The fluid connector recited in claim 9, wherein said hub is manufactured from plastic.

17. A fluid connector assembly, comprising:
 a body comprising:
  a through-bore forming an inner surface; and,
  a shoulder extending radially inward from said inner surface;
 a plug arranged within said through-bore of said body, the plug comprising an indent and a tab arranged adjacent to said indent and extending radially outward from said plug; and,
 a sealing member arranged in said indent and axially arranged between said tab and said shoulder, wherein said tab is operatively arranged to secure said sealing member to said shoulder.

18. The fluid connector assembly recited in claim 17, wherein said indent engages the shoulder.

19. The fluid connector assembly recited in claim 17, wherein said tab is deformable.

20. The fluid connector assembly recited in claim 19, wherein said plug comprises a channel circumferentially arranged and extending axially into said plug.

21. The fluid connector assembly recited in claim 19, wherein said deformable tab deforms to allow removal of said plug without removal of said sealing member.

22. The fluid connector assembly recited in claim 17, wherein said indent allows said plug to pressure seal said through-bore of said fluid connector.

23. A fluid connector assembly, including a plug installed within a through-bore of a fluid connector, and including a sealing member on said plug within said fluid connector, and including a cap on said fluid connector to enclose said sealing member, made by the process of:

removing said cap from said fluid connector;

installing a hub within said through-bore of said fluid connector;

securing said fluid connector to said hub, which includes deforming a tab of said fluid connector to secure said hub to said fluid connector.

24. The fluid connector assembly recited in claim 23, made by the further step of removing said plug from said through-bore of said fluid connector.

* * * * *